US008064773B2

(12) United States Patent
Dagan et al.

(10) Patent No.: US 8,064,773 B2
(45) Date of Patent: *Nov. 22, 2011

(54) MULTI-CHANNEL OPTICAL COMMUNICATION

(75) Inventors: Alon Dagan, San Diego, CA (US); Fred Sather, Escondido, CA (US)

(73) Assignee: Emcore Corporation, Albuquerque, NM (US)

( * ) Notice: Subject to any disclaimer, the term of this patent is extended or adjusted under 35 U.S.C. 154(b) by 836 days.

This patent is subject to a terminal disclaimer.

(21) Appl. No.: 12/047,888

(22) Filed: Mar. 13, 2008

(65) Prior Publication Data

US 2009/0232505 A1  Sep. 17, 2009

(51) Int. Cl.
*H04B 10/00* (2006.01)

(52) U.S. Cl. ............ 398/135; 398/98; 398/99; 398/100; 398/75; 398/141; 398/183; 398/138; 385/89; 385/90; 385/92; 385/93; 370/352; 370/389; 370/392; 370/468; 370/466

(58) Field of Classification Search .......... 398/75, 398/79, 135, 136, 137, 138, 139, 164, 91, 398/182, 183, 186, 141, 98, 99, 100, 101, 398/158, 155, 159, 128, 130, 71, 72, 74, 398/76; 385/24, 15, 88, 89, 90, 92, 93, 31; 370/352, 465, 545, 536, 468, 389, 392, 535, 370/476, 466, 401, 907

See application file for complete search history.

(56) References Cited

U.S. PATENT DOCUMENTS

| 5,461,693 | A | 10/1995 | Pimpinella |
| 5,867,484 | A | 2/1999 | Shaunfield |
| RE37,125 | E | 4/2001 | Carlson et al. |
| 6,920,113 | B1 | 7/2005 | Kovvali et al. |
| 7,099,584 | B1 * | 8/2006 | Narvaez et al. ............... 398/58 |
| 7,720,385 | B2 * | 5/2010 | Dagan et al. ............... 398/98 |
| 2002/0129379 | A1 | 9/2002 | Levinson et al. |
| 2003/0076558 | A1 | 4/2003 | Raman et al. |
| 2003/0223409 | A1 | 12/2003 | Wiebe |
| 2004/0033079 | A1 * | 2/2004 | Sheth et al. ............... 398/135 |
| 2004/0141747 | A1 | 7/2004 | Kenny et al. |

FOREIGN PATENT DOCUMENTS

| EP | 0 492 862 | 7/1992 |
| EP | 0 828 356 | 3/1999 |
| EP | 0 951 154 | 10/1999 |

* cited by examiner

*Primary Examiner* — Hanh Phan

(57) ABSTRACT

An optical fiber communications apparatus comprises a housing provided with a motherboard and a plurality of modular cards, each of which is engageable with the motherboard via one of the card receptors. A optical card includes an optical transceiver for communication using a digital, optical communications signal over a single optical fiber link. Each modular card is provided with a plurality of circuit sub-assemblies, each circuit sub-assembly being configured for digital communication with a respective local audio, video or data electronic device via a respective connector using a respective electronic information-carrying signal. Each circuit sub-assembly is configured for communication of an audio, video or data information-carrying signal with the transceiver using the digital, optical communications signal. Additionally, some circuitry assigns time periods for the individual information-carrying signals of the circuit sub-assemblies, and time division multiplexes the communications over the single optical fiber link.

20 Claims, 10 Drawing Sheets

Step A - Select the number of locations you have in your system

| Product Configurator ⏐ My Projects ⏐ Update Your Info | Welcome TBC    Sign Out |
|---|---|

OptivaConfigurator

Locations

How many Transmitting and Receiving locations do you have?

[2 ▾]

Select the number of all locations (or "nodes") which you plan to transmit or receive one or more signals.

A "location" can be a City, Station, Building and/or a Room.

Select "2" if you are simply transmitting from one location to another

[NEXT]

FIG. 7a

Step B - Name your locations.

| Product Configurator ǀ My Projects ǀ Update Your Info | Welcome TBC    Sign Out |
|---|---|

OptivaConfigurator

Name Locations

Would you like to name your locations?

[YES]    [NO]

| Product Configurator ǀ My Projects ǀ Update Your Info | Welcome TBC    Sign Out |
|---|---|

OptivaConfigurator

Name Locations

Change the default location names below

Broadway    Lexington 12 characters maximum per name.

[NEXT]

FIG. 7b

Step C - Select the most suitable housing unit, a factor which is directly linked to the environment in which your systems will be situated.

Step D - Now we select from various videos, audio and data signals we wish to transport Step E - Select your optical fiber preference.

OptivaConfigurator

Your System

Broadway — 1 Fiber — Lexington

SIGNALS:      OPTICAL LINK 1
2 SDI video Receive
3 Analog Bal. 600 Ohm Audio Receive
4 Ethernet 10/100 Data Duplex
SLOTS: 2
OPTICS: No Selection, OC
BANDWIDTH: 1250 Mbps Tx, 9.2% Utilizaton/
2250 Mbps Rx. 59.5% Utilizaton SIGNALS:      OPTICAL LINK 1
2 SDI video Transmit
3 Analog Bal. 600 Ohm Audio Transmit
4 Ethernet 10/100 Data Duplex
SLOTS: 2
OPTICS: No Selection, OC
BANDWIDTH: 1250 Mbps Tx, 59.5% Utilizaton/
2250 Mbps Rx. 9.2% Utilizaton

Your Cable

| | |
|---|---|
| Multi Mode | ○ |
| Single Mode | ⊙ |

[NEXT]

FIG. 7e

Step F - Select your optical fiber parameters/requirements (budget/distance).

3 Analog Bal. 600 Ohm Audio Receive
4 Ethernet 10/100 Data Duplex
SLOTS: 2
OPTICS: No Selection, OC
BANDWIDTH: 1250 Mbps Tx, 9.2% Utilizaton/
2250 Mbps Rx. 59.5% Utilizaton 3 Analog Bal. 600 Ohm Audio Transmit
4 Ethernet 10/100 Data Duplex
SLOTS: 2
OPTICS: No Selection, OC
BANDWIDTH: 1250 Mbps Tx, 59.5% Utilizaton/
2250 Mbps Rx. 9.2% Utilizaton

Your Optics

Please select your optical preference

| Filter Type | Link Budget | Distance+ | |
|---|---|---|---|
| SM | 10 dB | Up to 20.0 Km | ○ |
| SM | 21 dB | Up to 20.0 Km | ○ |

Many other solutions are available. Contact Opticomm to discuss your needs.

Note: The above options are listed in order from lowest to highest price.
*Subject to pricing or other factors which may reduce available link budget

[NEXT]

FIG. 7f

Step H - A specially tailored optical communication system has now been created, with precise model numbers allocated to the specified requirements.

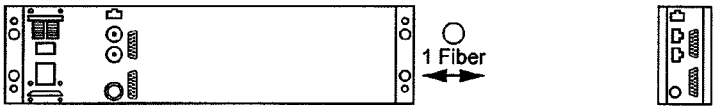

FIG. 7g

Final Configuration - System Diagram

Once the system has been designed, a project number is allocated which, when imported into an internal production system automatically creates a bild of materials, assembly drawings and procedures for building the precise system designed.

FIG. 7h

MULTI-CHANNEL OPTICAL COMMUNICATION

FIELD OF THE INVENTION

The field of the invention relates to communication systems and more particularly to optical communication systems.

BACKGROUND OF THE INVENTION

The invention relates to an apparatus and a method for transmission of data over a network, and from point to point. More particularly, it relates to an apparatus and method for configuring a multi-purpose optical transmitter or transceiver for communication of video, audio, and data signals, each with differing protocols, on a fiber optic network capable of utilizing a single optical fiber to communicate any of the differing types of signals and protocols associated with it. Further, a software program is provided to allow users to configure or customize the system using menu-driven graphical interface screens and common configurable components.

With the ever-widening reach of public and private data networks used by the public, and especially by business and government, there continues to be an increase in the flow of electronic data over such networks. Such communications may be from remotely-located differing branches of government offices, or different divisions of a company. Further, such electronic communications may include video, audio or other types of data signals, each with its own communications protocols that must be followed in the transmission and reception of intelligible communications signals.

Additionally, with this rise in electronic traffic between remote locations worldwide, there is an ever-increasing demand for a transmission system that can both transport and accommodate increasing levels of bandwidth consisting of multiple channels of video, audio and/or data over long distances. The optimum solutions for this demand are systems which involve the least number of transmission mediums as possible and that are unaffected by environmental hazards from static and electrical disturbances.

Satellite communications, such as those involving the frequency band of 390 MHz to 2150 MHz (often called the L-band) provide significant bandwidth. Once the L-band signal is received, it is increasingly desirable to use a fiber optic communication network (which provides sufficient bandwidth to accommodate data through-put of the order produced by satellite communications) to transmit that data terrestrially.

In general, fiber optics serve as the best solution to the problem of environmental interference. Transmission of electronic signals for data of all types over fiber optic networks will eliminate EMI radiation, EMI susceptibility and other factors which would otherwise affect copper or other cable. Consequently, this makes fiber the choice for high quality video transmission as well as conventional data transmission.

However, as noted, there are a variety of video, audio and data signals, using protocols specific to the type of signal carried, that a multipurpose fiber optic transmission system may accommodate. Conventionally, for each of these signal types and their respective protocols, a generally unique transmission component is employed to generate the corresponding signal.

Because each user at each transmission and reception site may be employing any or all of the different electronic signals and protocols, it is a complex task to design and manufacture site-specific data transmission systems that will communicate with remote sites and which may be required to accommodate the same or other types of electronic data signals and associated protocols. Such differing types of data stream transmission and reception requirements (even between two remote locations of the same company or government department) can create logistical difficulties. Furthermore, designing a data transmission and reception system which will suit each customer's individualized needs can be complex and time consuming. In the case of satellite-derived transmissions, it may be desirable to transmit the signal across a fiberoptic communications network without changing the corresponding transmission protocol or otherwise changing the signal, together with video, audio or other data.

Currently, such designs may entail computers with multiple types of data transmission cards or components engaged to local and wide area networks. Generally, each type of data will require a corresponding card or component. Of course, each of the differing cards or components may also require software or drivers to allow it to communicate with the controller or computer with which it must send and receive signals according to the proper communications protocol. Further complications arise when signals originate over an Ethernet or satellite network, and must be converted to transmission over a fiber optic network for communication to the remote destination.

Therefore, it can be seen that there is a pressing need for an apparatus, and a corresponding method, that provides a single system to communicate the various data types that might originate in any highly-customized client venue location, and that allows for transmission of those signals to one or more remote locations using a fiber optic network. Such a system should allow for any type of conventionally-employed data protocol to be used by the originator and receiver of the signals, yet still allow the signals to be transmitted over a fiber optic network.

Still further, in a particularly preferred mode of the invention, a configuration of the manufactured system allows for customization by the buyer according to the existing communications streams and protocols being currently used by the buyer. The buyer is able to design a customized component, the component thereby being able to accommodate current communications data streams and protocols and to communicate them to remote locations using a single apparatus providing fiber optic transmission. Such customization, heretofore being hard to achieve if at all, allows users to maintain their current network communications types and protocols, while still being able to take advantage of the benefit of fiber optic network transmission. This eliminates any requirements for the users to upgrade and change all their systems and protocols before taking advantage of the benefit of fiber optic network communications, thereby eliminating the costs and inevitable problems that such an upgrade would entail.

As such, those skilled in the art will appreciate that the conception upon which this disclosure is based may readily be utilized as a basis for designing other methods and systems for carrying out the several purposes of the present invention. It is important therefore that the claims be regarded as including equivalent constructions insofar as they do not depart from the scope of the present invention.

SUMMARY OF THE INVENTION

An aim of this invention is the provision of a fiber optic transmission system that will accommodate highly-divergent types of electronic data stream transmissions and related protocols in a fiber optic transmission.

Another aim of this invention is the provision of a system which allows the user or buyer to configure the produced device for fiber optic transmission, to accommodate individual on-site electronic transmission types and protocols, and allows different data streams having differing protocols to be transmitted over a fiber optic network. Preferably, the invention allows the transmission of the differing data streams and corresponding protocols over a single optical fiber.

A further aim of this invention is the provision of a customizable component which allows the user to design the device using menu-driven software and network access, and the provision of the resulting fiber optic transmission device and software customized to those user requirements.

According to a first aspect, the invention provides for an optical fiber communications apparatus comprising:

a) a housing provided with a motherboard and with a support defining a plurality of card receptors; and b) a plurality of modular cards, each of which is engageable with the motherboard via one of the card receptors;

c) an optical card comprising a first of said modular cards, said optical card including an optical transceiver for communication using a digital, optical communications signal over a single optical fiber link;

d) each modular card being provided with a plurality of circuit sub-assemblies, each circuit sub-assembly being configured for digital communication with a respective local audio, video or data electronic device via a respective connector using a respective electronic information-carrying signal;

e) each circuit sub-assembly being configured for communication of an audio, video or data information-carrying signal with the transceiver using the digital, optical communications signal; and f) firmware for:

assigning time periods for the individual information-carrying signals of the circuit sub-assemblies, thereby controlling transmission of communications between the optical transceiver and the circuit sub-assemblies, and time division multiplexing those communications over the single optical fiber link to communicate a predetermined combination of audio, video and data channels multiplexed onto a single optical channel carried by the optical fiber link.

This apparatus permits TDM methods of operation to transmit audio and/or video and/or data channels over a single optical fiber link. Therefore data streams from disparate sources may be combined and transmitted via a common fiber optic link without the need for converting the data unnecessarily.

Said firmware may arrange said circuit sub-assemblies into a daisy chain arranged with reference to a relative position of said modular cards on said bus.

Preferably, each modular card is adapted to determine whether a successive card is engaged with the bus and, if so, to inform the successive card of the FPGAs of the daisy chain, said successive card being adapted to add itself to the daisy chain. Preferably, said successive card only adds itself to the daisy chain if there is sufficient available bandwidth.

Said optical transceiver may operate at a channel bandwidth and each of said circuit sub-assemblies may operate at corresponding sub-assembly bandwidths wherein an available bandwidth comprises the channel bandwidth less the sum of the sub-assembly bandwidths of all of the circuit sub-assemblies of the daisy chain and wherein said successive card is adapted to add the circuit sub-assemblies of said successive card to the daisy chain only if the available bandwidth is equal to or greater than the combined sub-assembly bandwidths of the circuit sub-assemblies of said successive card.

Preferably said apparatus further comprises a processor for assigning a time period to an information carrying signal of a corresponding circuit sub-assembly according to a maximum bandwidth of the corresponding circuit sub-assembly. This ensures that all information transmitted by the information carrying signals will be communicated by the optical fiber link.

Said optical card may communicate using said digital, optical communications signal over said single optical fiber link at a fiber channel bandwidth and said apparatus may include a processor for arranging said plurality of circuit sub-assemblies into a chain wherein a sum of the maximum bandwidths of all of the circuit sub-assemblies of said chain is less than or equal to the fiber channel bandwidth.

This provides a relatively simple way of creating a daisy chain of data streams corresponding to said information-carrying signals whilst ensuring that each data stream of the chain will be accommodated by the optical link.

The optical transceiver may be such as to communicate using a digital optical communications signal operating in a first common communications protocol over the single optical fiber.

Each circuit sub-assembly may be such as to communicate with its respective electronic device using a second protocol which is an audio protocol, a video protocol or a data protocol.

The second protocol may corresponds to data communicated by satellite.

Each circuit sub-assembly may control communications with the respective local electronic device.

Each modular card may comprise a plurality of sockets, each socket being adapted to receive a corresponding circuit sub-assembly.

Circuit sub-assemblies may be received by corresponding sockets so that each circuit sub-assembly is removably pluggable.

Any one of said modular cards may be configurable according to the circuit sub-assemblies provided therewith.

Each circuit sub-assembly may be an FPGA mounted on an FPGA socket associated with the respective modular card.

The digital, optical communications signal may be an Ethernet protocol signal.

Each information-carrying signal may be any one of a group of video, audio, and data protocols including composite video, SDI, HDSDI, DVD-ASI, S-Video, VGA, DVI, and HDMI, analogue audio, studio quality audio, digital AES/EBU audio, RS-232, RS-422, RS-485, dry contact, 10/100 Ethernet, and gigabit Ethernet.

According to a further aspect, the invention provides an optical fiber communications system comprising a first optical fiber communications apparatus and a second optical fiber communications apparatus, each of said optical fiber communications apparatuses being as hereinbefore described, said system further comprising a single optical fiber link connecting the first and the second optical fiber communications apparatuses for communication using a digital, optical communications signal.

Each optical fiber communications apparatus may have the same number of modular cards, the modular cards in the first optical fiber communications apparatus being arranged to mirror the configuration of the modular cards in the second optical fiber communications apparatus, and the circuit sub-assemblies provided in the first optical fiber communications apparatus being arranged so as to mirror the circuit subassemblies in the second optical fiber communications apparatus.

The use to which the invention is put discussed above has concentrated on the application of the data communication (e.g. whether the data relates to audio, video or packet-switched networks). It is to be realized however that the invention finds application regardless of the type of data which is being communicated. In a further example, different information carrying signals may correspond to different networking protocols. One of the advantages of the invention lies in that it is not necessary to convert from one network protocol to another, but that various types of protocol can be easily transmitted across a single fiber optic cable. Therefore, the invention is equally applicable to hybridized networks which mix data derived from satellite communications with audio, video and conventional Ethernet or Wi-Fi derived data (for example), so that all types of data can be communicated across a single fiber.

The system also provides for a degree of customization, by permitting a user to modify the system to take account of different transmission requirements at different times. Thus, by adding mirrored further modular cards to each of the apparatuses, the system can be expanded to cover additional audio/video/data transmission requirements.

These, together with other aims and advantages, which will become subsequently apparent, reside in the details of the construction and operation as more fully hereinafter described and claimed, reference being had to the accompanying drawings forming a part thereof, wherein like numerals refer to like parts throughout.

The above problems and others are overcome by the herein disclosed apparatus and system, allowing user design of a system customized to individual communication types and protocols. The resulting system combines the differing user required communications types and protocols into one system, which allows communication over a single optical channel, which may operate at a predefined wavelength, of the many divergent protocols and data requirements of differing users.

Utilizing advanced Time Division Multiplexing (TDM) methods of operation, and a unique daisy chained series of modular (component processing) cards, engageable operatively in a bus (the support defining the card receptors), transmission of multiple channels and varieties of data transmission are achieved over a single fiber optic cable. The system so configured accepts different video, audio and data electronic signals and protocols for transport in any number of channels and combinations. Still further, in a particularly preferred mode of the device, the device maximizes used bandwidth through employment of Coarse Wave Division Multiplexing (CWDM) or Dense Wave Division Multiplexing (DWDM) techniques in combination with its TDM capabilities. Using one or a combination of components and techniques, the resulting device, user-configured to individual requirements, provides transmission of many channels and protocols over a minimal number of optical fiber strands.

The system consists of a smart combination of Multiple Clock Domains Division and Recovery technique that is implemented on an individual modular card. Each modular card is adapted to transmit and receive different electronic formats of video, data or audio protocols, depending on user requirements. All cards configured to process one or a plurality of individual data streams and protocols are also configured to be modular, scalable and flexible.

For example, if one channel of analog video is required by the user, the same system could accommodate more than one channel of the same video (or other protocols of audio or data) and would be configured with components adapted to transmit the one channel. Therefore, each card is scalable in its function as a communications module. The modular cards, configured to the data and protocol requirements of the user, are engaged by a common bus, with one of the cards being a master optical transmission card. Differing data in the differing protocols are received by the individual cards adapted to handle it, and thereupon communicated to the optical transmission card for transmission over fiber optic lines of communication. A reverse process occurs at the receiving site where a substantially identical configuration of electronic cards is engaged with a bus to receive the fiber optic transmission.

The resulting system forms a daisy chain between the modular cards engaged through the bus.

Each of the customized modular cards inserted into the bus will communicate its data to a modular card configured as a master card at the appointed time designated to its position in the chain of cards. The end card on the bus will ascertain its position as last in the chain of cards and communicate that terminating position so that the controlling card configured as an optical transmission card will be able to assign transmission times and durations to the different cards in the chain based on the number in the chain. There are no technical limitations to the number of modular cards that can constitute a single daisy chain between the optical transmission card and the last card in the chain other than available bandwidth. The number of cards that would transmit over a single fiber wavelength would be limited by the total bandwidth of the optical fiber channel which is either 1.5 Gbit/sec or 2.5 Gbit/sec, depending on the optical transceiver of the optical card.

At least one of the cards may be adapted to communicate satellite derived transmissions. In particular, satellite derived transmissions may be L-band satellite transmissions.

When the system/laser bandwidth is maximized, fiber strands coming from other cards can be combined together using CWDM or DWDM techniques. This is used in order to create a larger multi-channel solution over a single fiber. The entire system is preferably managed by an optional SNMP Ethernet-based protocol.

In a particularly preferred mode of the method of configuration of the device, each produced system can be individually configured by the user/designer on-line. This user customization to provide for user-selected individual communications types and related required protocols is heretofore unachievable for such a complex system with so many components that may interface with one another. However, using the system of base component cards customizable to any type of user required protocol and an interface of proprietary software allows the configuration of a system tailored specifically to a client's needs, and the device may be actually designed by the buyer or user on-line and then produced.

The menu driven, on-line software assists in building the system to meet the communications protocols input by the user, and output the data to the factory to support the actual production of systems ordered. Then, employing the component electronic cards that are customizable to a plurality of data format and protocol requirements, the components required are inserted into mating receivers. Next, operating instructions adapted to operate the inserted components on the card according to the user's protocol requirements, and to communicate with any others in the chain of configured cards, and the optical transmission card, are populated to the card. Finally, one or a plurality of the component cards, configured with both engaged components and operating instructions adapted to handle the user data protocol requirements are engaged with the bus and back plane in a slotted engagement in a receiver, along with a card configured to function as optical transmission card (master card).

During an initialization phase, a daisy chain of circuit sub-assemblies is constituted. Communication over the optical link will then be controlled by the optical card according to the established daisy chain.

A mirrored set of optical and modular cards is positioned at the opposite end of the fiber optic cable for sending and receiving the various data, video, and optical protocols. Thus, the card acting as the optical card, and therefore the master on each system in receiving mode, will send and receive electronic signals, at specified times and durations, to the individual circuit sub-assemblies, on an individual card in a slot which is in the identical position as that of the transmitting system.

This unique component configuration adaptable to the user/buyer input for individual communications protocols provides for customization for differing user data protocols. Further, the unique provision of daisy chaining of component cards and Time Division Multiplexing (TDM) by the controlling optical transmission card in the chain improves the amount and type of data transmission achievable by a unit in the smallest amount of time over a single fiber optic cable.

With respect to the above description then, it is to be realized that the optimum relationships for the invention are to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction, mixtures, and operation shown and described, and accordingly, all suitable modifications and equivalents may be resorted to, falling within the scope of the invention.

BRIEF DESCRIPTION OF THE DRAWINGS

FIGS. 7a-h depict the graphic interface and steps providing for user configuration using a menu driven interface accessible over a network, wherein the employment of the common cards of FIG. 2 allows a fiber optic transmission system to be designed by a user and manufactured using the common configurable electronic cards populated with appropriate circuit sub-assemblies and operating instructions;

DETAILED DESCRIPTION OF PREFERRED EMBODIMENTS

FIGS. 1-7 show some preferred embodiments and operational modes of the present invention, and a modular configuration providing for user configuration of fiber optic data transmission system and production thereof based on user or buyer input to configure the modular cards 12 on which the system is based.

Figure 1:
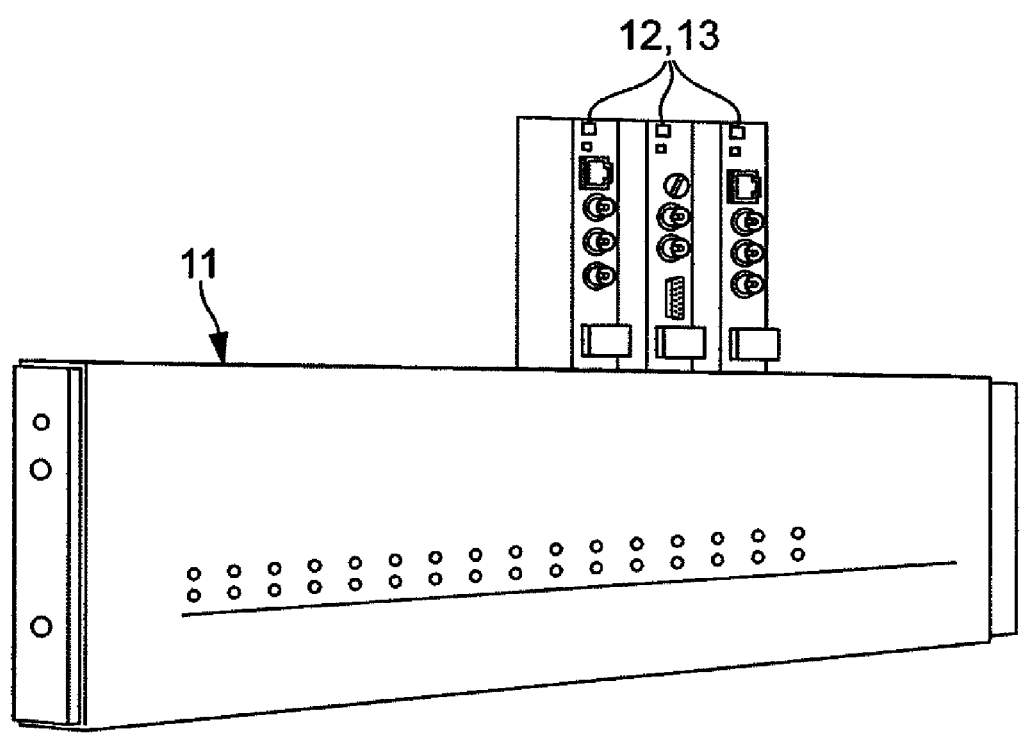
FIG. 1 is a perspective view of an optical transmission system constructed in accordance with the invention.

As shown in FIG. 1 an optical transition system constructed in accordance with the invention comprises a housing 11 which houses a motherboard (not shown) connected to a bus (not shown). The bus is further connected to a plurality of slots (not shown), each of which can receive a modular card 12/13 to be described below.

Figure 2:
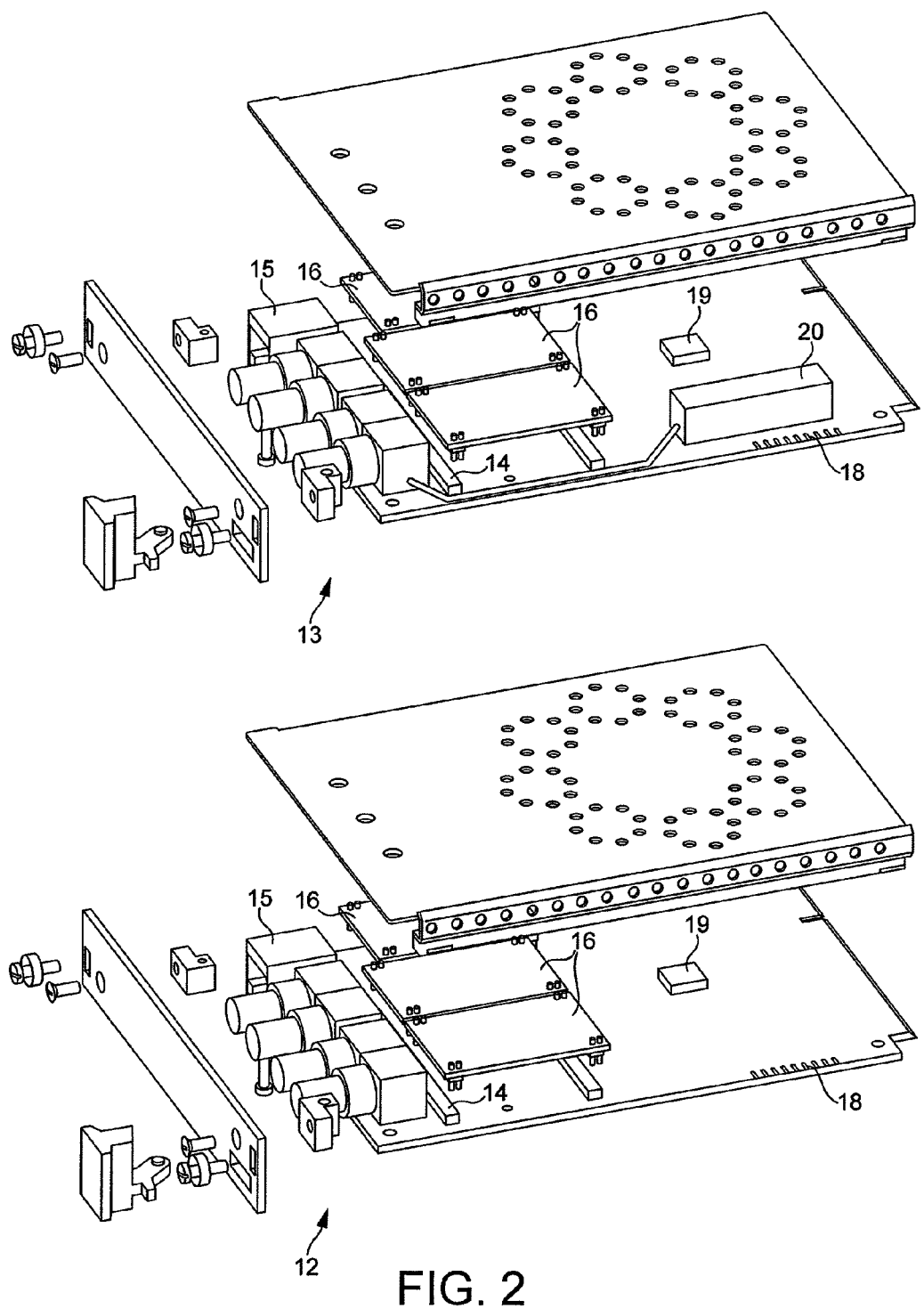
FIG. 2 is a perspective view of a configurable card forming part of the system of FIG. 1; adapted for population with any three of a plurality of different field programmable gate arrays (FPGAs), to provide for user-chosen communications protocols and requirements.
Figure 3:
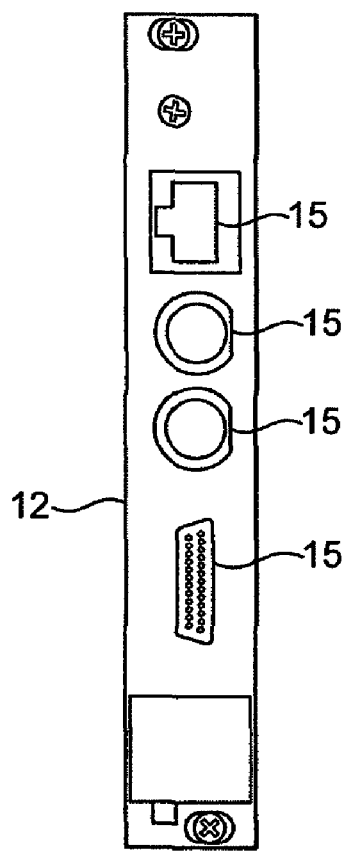
FIG. 3 is an end view of a mounted card of FIG. 2 as engaged with a bus, showing mating connections for different types of communications terminating connectors for wire and fiber optic cables.
Figure 4:
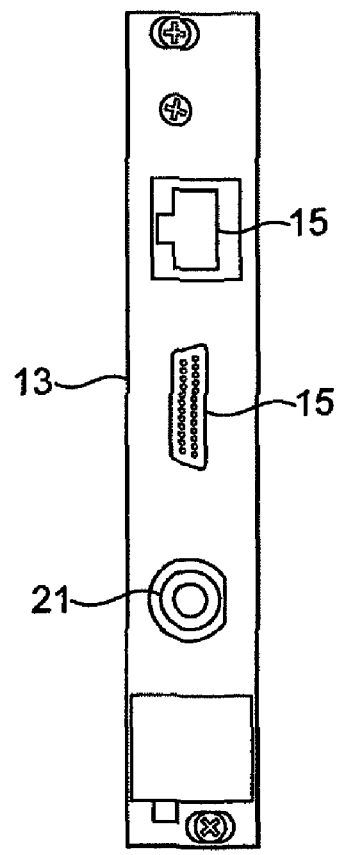
FIG. 4 shows the card of FIG. 2 outfitted to function as an optical transmission card adapted for fiber optic transmission over an engaged cable.

As depicted in FIG. 2, common cards 12, 13 are provided and are adaptable for multiple configurations with components and operating instructions to drive the chosen components for that card. The common cards may be configured as a modular card 12 or as an optical card 13, the difference between the modular card 12 and the optical card 13 being that the optical card 13 is provided with the requisite hardware for establishing a communications channel over a fiber optic link. Therefore, optical card 13 includes a vertical cavity surface emitting laser (VCSEL) 20 attached to a fiber optic connector 21. The fiber optic card 13 controls the manner in which information is transmitted across the fiber optic channel (in the manner described below) and is therefore also referred to as a 'master card'.

The modular card 12 and the optical card 13 are both configurable by allowing for engagement with up to three circuit sub-assemblies 16. In the embodiment illustrated, the circuit sub-assemblies 16 are field programmable gate arrays (FPGAs) adapted to transmit and receive different formats of video, data or audio information-carrying signals encoded with a corresponding protocol. The information-carrying signals are delivered to the FPGAs as a data stream. The ultimate configuration of each modular card 12 or optical card 13 in this respect may be handled by the factory, or may be determined by user input in a menu-driven ordering system employing a graphic interface available to the user over network communication. The user, choosing from a listing of communications proposals chooses one or a plurality of requirements for individual data stream needs, wherein one or a plurality of modular cards 12 is populated with appropriate components and operating instructions and optical communication components. The FPGAs engage with the modular cards 12 and fiber optic cards 13 by plugging into sockets 14. The sockets 14 are configured so that the FPGAs are easily removable (i.e. may be removed by hand).

Each modular card 12 and optical card 13 is adapted for engagement with a bus and, via the bus to the motherboard of the processing unit 11 (FIG. 1). Each modular card 12 is configurable as a combination multi-protocol communications card acting as an optical transmission card as in FIG. 3, or as multi-protocol communications modular card which is controlled by an optical transmission card 13 as in FIG. 4. As illustrated in FIGS. 7 and 8, the modular card 12 and the optical card 13 include receptacles to accommodate jacks corresponding to the particular protocol of the data to be conveyed. For example, S-Video may be accommodated by one of the circuit sub-assemblies 13 in which case the modular card 12 or optical card 13 will include a receptacle for accommodating an S-Video jack.

Electronic engagement to the bus and the motherboard is provided by electrical contacts 18. Contacts 18 further engage frictionally with the slots of the processing unit 11.

The modular cards 12 and optical cards 13, when so engaged with the bus, communicate through the bus with the motherboard and with the other cards in the other slots. All modular and optical cards are operatively engaged to a power supply powering both the motherboard and all modular cards 12 and the optical cards 13 so engaged.

Figure 5A:
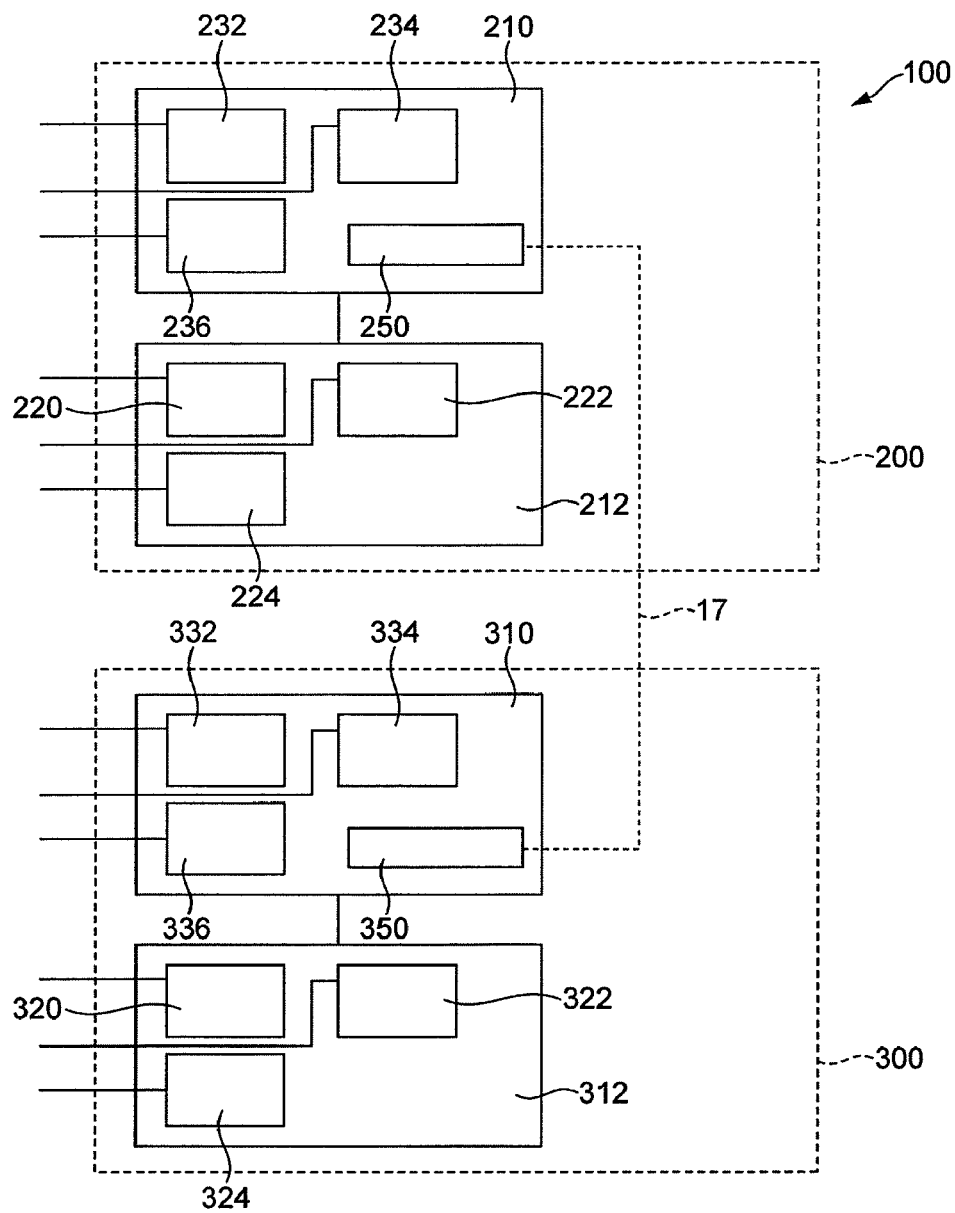
FIG. 5A illustrates a communication system according to a preferred embodiment of the invention.
Figure 5B:
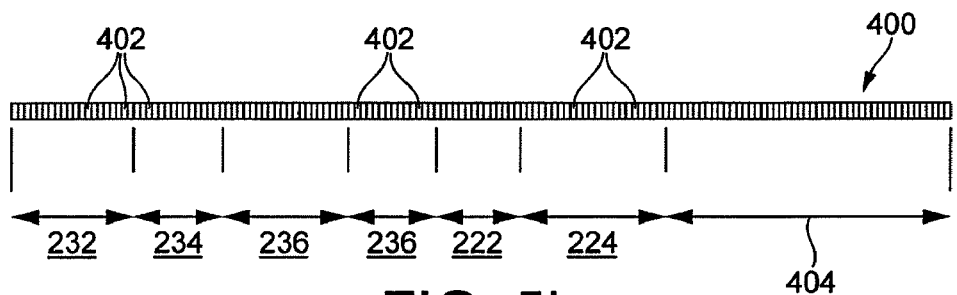
FIG. 5B illustrates a data stream of the communication system of FIG. 5A.
Figure 6:
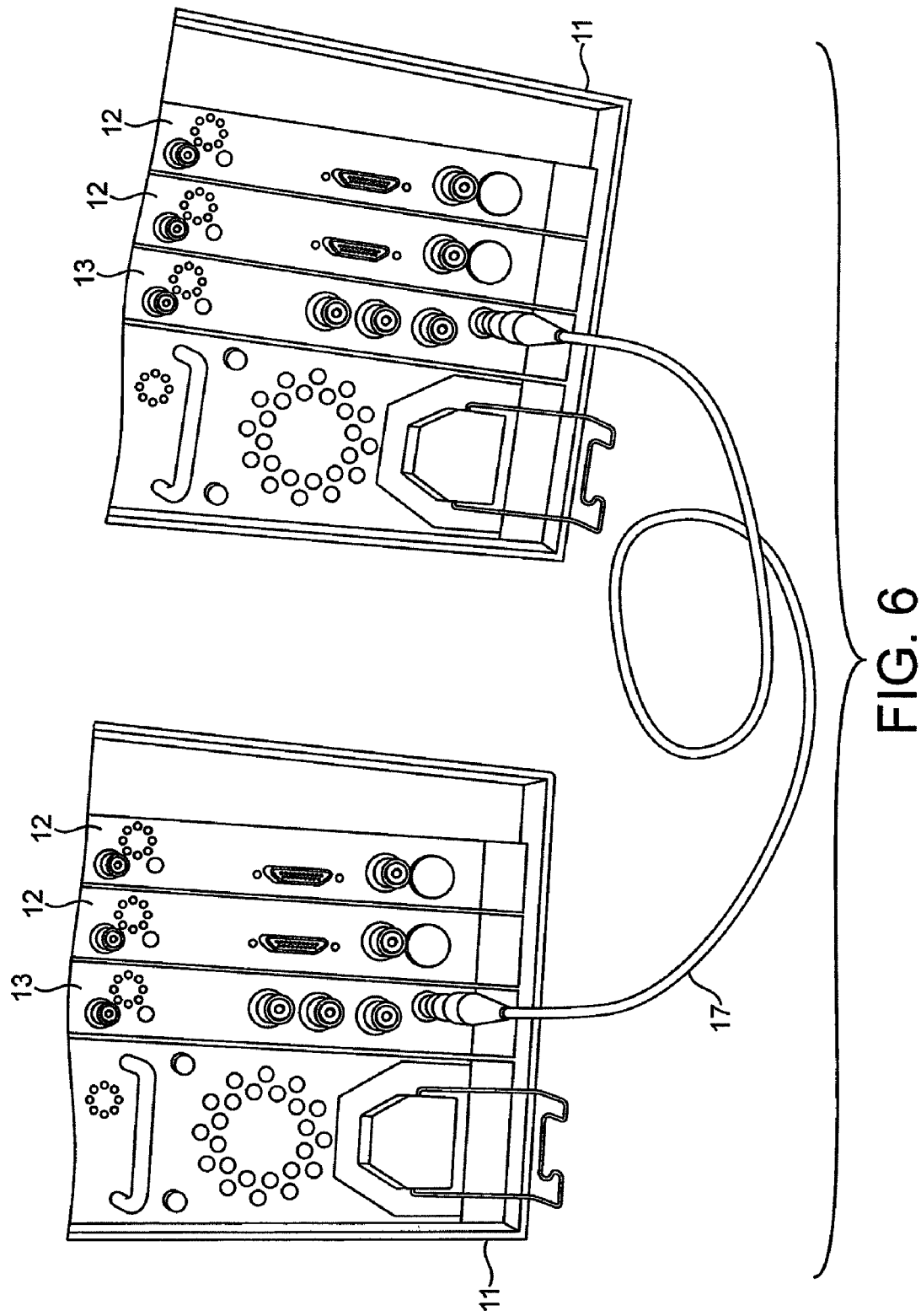
FIG. 6 depicts two fiber optic engaged processing units of the system of FIG. 1, with a plurality of cards communicating over a fiber optic link.

In a conventional fashion, the motherboard and the cards 12 and 13 are engaged in a housing of the processing unit 11 (see FIGS. 1 and 5). The modular cards 12 and the optical cards 13 are also populated with cable connectors 15 adapted to the data stream protocols and types of cable indicated by the user for input and/or output of the individual data streams chosen, and which are supported by the populated FPGAs 16 and operating instructions stored in a processor (or firmware) 19 on the card 12 or 13 to drive the chosen FPGAs 16.

Each FPGA 16 controls a corresponding data stream. The system is therefore able to handle as many data streams as there are FPGAs. As described, the FPGAs process the data of that data stream encoded according to the corresponding protocol.

As noted, each modular card 12 is adapted for a user-designated configuration, by populating the card 12 with one to three FPGAs 16, adapted to handle the selected data steam types and corresponding protocols, and communicate to an optical card for fiber optic transmission. The FPGAs 16 chosen to accommodate the chosen data streams and protocols are populated to the cards 12 in one of three possible positions on each of the cards.

Consequently, each card can be configured as an optical card 13 with one or a plurality of FPGAs 16 which serves as the master, or as a daughter modular card 12 with one or a plurality of FPGAs 16 in individual designated positions on each card. The daughter modular cards 12 provide fiber optic transmission capability of multiple individual protocols by communicating with a master optical card 13, in a fiber optic transmittable protocol derived from up to three communications protocols from a group of protocols including video, audio, and data protocols. By employing one modular card 12, with up to three protocols engageable to a common bus, and controlled by a modular card configured to be an optical card 13 also having up to three protocols provided by engaged FPGAs 16 thereon, user customization of the configured system is maximized, manufacturing costs are minimized, and great time savings are achieved. Further, using the unique mode of operation, noted herein, system operation is simplified for the user.

The populated modular card 12 is engaged to the base motherboard, and will thereafter transmit and receive any of the chosen specific data stream formats of video, data or audio, over a fiber optic cable 17 (see FIG. 6) using the modular card configured to operate as a master optical card 13. Communication between all the FPGAs 16 on all the cards 12 and 13 is in a common fiber optic transmittable protocol. This common protocol is adapted for the most reliable communication over the fiber optic cable 17. However, it could be in another protocol in addition to a common fiber optic protocol such as an IP/Ethernet protocol.

The optical card 13 is adapted from a modular card 12 to transmit with the common fiber optic protocol using an optical transceiver in the form of fiber optic laser 20 (see FIG. 2) and receiver engaged to the modular card in the receiver 14 adapted for operative engagement. Software to drive the laser 20 and the receiver to transmit and receive in the common fiber optic protocol, is also populated to the processor 19 on the optical card 13 as is software making it the master card for any associated modular cards 12. Optical communication to one or a plurality of fiber optic transmitting and/or receiving systems, with similarly configured modular cards 12, is provided by a fiber optic connector 21 engaged to the fiber optic cable 17.

The modular cards 12 in the daisy chain are customizable for multi-oriented video, audio, and data streams in their respective protocol, all on the same card 12. Video signals supported on a card 12 in combination with audio and data include: composite video, SDI, HD-SDI, DVD-ASI, S-Video, VGA, DVI, and HDMI. Audio signals for which the modular cards 12 are configurable along with video and data signals, include analog audio, studio quality audio, digital AES/EBU audio, and others. Data signals supported in combination with the audio and video include RS-232, RS-422, RS-485, dry contact, 10/100 Ethernet, and gigabit Ethernet. Of course those skilled in the art will realize that other protocols can be accommodated now, or as they develop, by positioning the appropriate FPGA 16 and populating the appropriate drivers to a card 12 or 13, and all such protocols are anticipated in the scope of this patent. Further, while the common protocol communicated to, and between, the optical transmission cards 13 could be an IP/Ethernet protocol if such is desirable.

As previously discussed, one of the FPGAs 16 relates to data communicated by means of satellites and the corresponding protocols. This FPGA is incorporated in either card 12 or card 13 and communicates the corresponding data across the fiber optic cable to the receiving processing unit 11 multiplexed with the other data types being communicated by that fiber strand.

In a particularly preferred mode of the method of configuration of the device 10, each system of two or more fiber optic transceiving processing units 11, shown in FIGS. 11*a-h*, is configurable by the user using an online interface as shown.

Figure 7C:
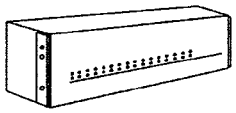
Figure 7D:
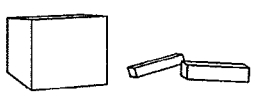

In a first step, the user logs onto a server and is provided with a graphical interface of steps for configuration. The user is first questioned (see FIG. 7*a*) about the number of locations between which communication must be enabled to determine the number of processing units 11 required for the system. Next (see FIG. 7*b*), the user is asked to name the locations or accept default names. In a next step (see FIG. 7*c*), drawing on user knowledge of the locations, a form factor for the casing housing of the processing units 11 is chosen by the user. Next (see FIG. 7*d*), a menu of different types of data streams or protocols from which to choose is presented, along with a transmission direction for each. The choices are provided by drop down menus in the graphic interface, from a library or lookup table of stored data streams supported by the FPGAs 16 and operating instructions that may be immediately populated to the cards 12, 13 and which provide the functionality corresponding to the data streams and directionality specified by the user. Next (see FIG. 7*e*), the user is questioned as to the optical fiber preference, since the user will know the type of fiber communicating between the earlier named locations. In a next step (see FIG. 7*f*), the user is questioned as to the distance requirements for the link between the named locations, so that appropriate fiber optical transmitters are chosen for population to the cards 12. Finally (see FIG. 7*g*), the user is queried about the connector type that will be required on the distal ends of the optical fiber 17 running between both locations. FIG. 7*h* shows the final configuration of the system.

Based on the user choices for data streams, the direction of communication, the data and/or signal protocols, and by employing the cards 12, 13 and the engageable FPGAs, one or a plurality of individual cards 12, 13 are populated with the appropriate FPGAs 16. The cards 12, 13 are further provided with the appropriate connectors for the cables communicating to the cards at both locations. If three or fewer protocols are to be accommodated, one card outfitted with the appropriate FPGAs 16 and a laser 20 transmitter and optical receiver is populated accordingly for each processing unit 11. If more than three protocols are required, additional modular cards 12 are populated accordingly with appropriate FPGAs 16.

From a selection of engageable connectors 15 adapted for engagement to the selected cable connectors chosen by the user in the ordering process, appropriate connectors 15 are populated to the modular cards 12 for the user sites. Once a sufficient number of modular cards 12 are populated with the FPGAs 16 that accommodate the chosen protocols, all of the modular cards 12 including the one configured as the optical transmission card 13, are engaged to the bus and the backplane of the motherboard in a slotted engagement in one of a plurality of slotted receivers for the cards 12 and 13 in the motherboard. The motherboard and the operatively-engaged cards 12 and 13 are then operatively engaged in the housing appropriate to the chosen form factor, and thus become the two processing units 11. The card or cards are then engaged in the motherboards and the two are engaged in the chosen housings to accommodate the chosen form factors. The two units for the system are then shipped to the user for easy installation.

Because of the unique system of operation noted herein, using mirrored positions for the FPGAs 16 and the respective cards 12 which accommodate the chosen protocols and directions of communication, and with the cards 12 being adapted to handle any of the chosen FPGAs 16 for those protocols, the system is easily configured, and the required end-user support is reduced.

FIG. 5A illustrates a system 100 for communicating over an optical fiber 17 according to a preferred embodiment of the invention. The system 100 includes a transmitting unit 200 and a receiving unit 300. The transmitting unit 200 includes an optical card 210 connected to the optical fiber 17. The transmitting unit 200 further comprises modular card 212. The optical card 210 and modular card 212 are connected to one another across a bus 214 in the manner described above with reference to FIG. 1. Included on modular card 212 are FPGAs 220, 222 and 224; and included on optical card 210 are FPGAs 232, 234 and 236. The optical card 210 further includes an optical transceiver 250 which comprises a VCSEL for optical communication across the optical fiber 17.

The receiving unit 300 of the system 100 is arranged to mirror the transmitting unit 200 and therefore includes an optical card 310 having an optical transceiver 350 for receiving data transmitted across the optical fiber 17 and FPGAs 332, 334 and 336. Receiving unit 300 further includes modular card 312 having FPGAs 320, 322 and 324. Optical card 310 and modular card 312 are connected by means of bus 314.

As described above, the configuration of the optical cards 210 and 310, as well as of the modular cards 212 and 312, will be determined when these cards are manufactured. Each of the data streams of the FPGAs of FIG. 9A will have a maximum throughput determined by the protocol of the data stream. The term "sub-assembly bandwidth" is used to refer to this throughput of each FPGA. The term "card bandwidth" is used to refer to the sum of the sub-assembly bandwidths of all of the FPGAs of an optical or modular card. The term "channel bandwidth" is used to refer to the maximum throughput of the optical transceivers 250 and 350.

The FPGAs of the transmitting unit 200 are arranged into a daisy chain in the following manner. The optical card 210 and the modular card 212 will be located in slots connected by bus 214 of the motherboard (not shown in this Figure). During an initialization process each card, starting with the optical card 210, will determine the available bandwidth and report this to the next successive card connected to the bus 214. In the embodiment illustrated in FIG. 9A only optical card 210 and modular card 212 are present and therefore here the optical card 210 will report the available bandwidth to the modular card 212. For optical card 210 the reported available bandwidth will be the channel bandwidth less the card bandwidth of optical card 210.

Modular card 212 will determine whether the reported available bandwidth is greater than or less than its own card bandwidth. If the available bandwidth is greater than the card bandwidth for modular card 212, the modular card 212 will add its own FPGAs 220, 222 and 224 to the daisy chain. If the available bandwidth is less than the card bandwidth for modular card 212, no additional FPGAs will be added to the daisy chain and the constituents of the daisy chain are reported back to the optical card without considering any additional installed modular cards.

It is to be realized that in further embodiments where the transmission unit comprises more than two cards, the aforementioned process is repeated for each card connected to the bus of the motherboard and is done so for successive cards determined by their position on the bus until the last card is reached. Once the last card has been reached, the constituents of the daisy chain will be known, and this is reported back, from card to card, until the original, optical card is informed thereof.

Therefore, with reference to FIG. 9A, the modular card 212 (which is the last card connected to bus 214) will inform optical card 210 of the constituents of the daisy chain.

In the embodiment illustrated, FPGAs 220, 222 and 234, and corresponding FPGAs 320, 322 and 334, are configured to communicate audio channels and each have a sub-assembly bandwidth of 0.1 Gbit/sec. FPGAs 232 and 236, and corresponding FPGAs 332 and 336, are configured to communicate video channels and each have a sub-assembly bandwidth of 0.2 Gbit/sec. FPGAs 224 and 324 are configured to communicate an Ethernet channel and have a sub-assembly bandwidth of 0.3 Gbit/sec. Therefore, the card bandwidth for optical card 210 is 0.5 Gbit/sec and the card bandwidth for modular card 212 will be 0.5 Gbit/sec. The channel bandwidth, determined by the optical transceivers 250 and 350 is 1.5 Gbit/sec.

When the initialization process begins, the optical card 210 will check to ensure that there is sufficient available bandwidth for it to join daisy chain. As this card is the first card connected to the bus, the available bandwidth will be equal to the channel bandwidth. The daisy chain will then be constituted as comprising the FPGAs 232, 234 and 236. FPGAs are added to the daisy chain according to their position on the optical or modular card.

The optical card 210 will then calculate the available bandwidth (the channel bandwidth less the card bandwidth of optical card 210) which here is 1.0 Gbit/sec. The calculated available bandwidth and the currently constituted daisy chain are then reported to the next card, which is modular card 212. Modular card 212 compares the available bandwidth against its own card bandwidth and, since the card bandwidth is less in this instance, will add its own FPGAs to the daisy chain which now comprises the FPGAs 232, 234, 236, 220, 222 and 224. Since modular card 212 is the last card attached to the bus 214 it will send the now constituted daisy chain back to the optical card 210.

Once the optical card 210 receives the daisy chain from the modular card time slots are allocated to each of the FPGAs in the daisy chain. FIG. 9B illustrates a portion of the data stream 400 which is communicated between transceivers 250 and 350. The data stream 400 comprises time slots 402, each of the same duration and each containing the same maximum amount of data. The optical card will allocate time slots 402 to an FPGA according to its bandwidth. Therefore FPGAs 234, 220 and 222, which have the same bandwidths, will be allocated the same number of time slots regardless of the actual amount of data which may be communicated between corresponding pairs of FPGAs. The slots allocated to each of the FPGAs of FIG. 9A are illustrated in FIG. 9B where time periods have been labeled with the labels for the corresponding FPGAs of FIG. 9A. Slots 404 represent unused bandwidth in this embodiment.

As stated, the receiving unit 300 of the system 100 is arranged in a like manner to the transmitting unit 200. Therefore the FPGAs of the receiving unit 300 correspond to FPGAs of the transmitting unit and form a daisy chain similar to that of Table 1. When the signal transmitted over the optical fiber 17 is received by the optical card 310 of the receiving unit, the optical card 310 assigns the data of the incoming slots to the corresponding FPGA of the receiving unit by following the reverse sequence of the daisy chain.

Although the aforementioned data transmission has been described in terms of a transmission unit 200 and a receiving unit 300, many of the communications which are facilitated by the FPGAs are communications which may occur in either direction. Therefore, appropriate FPGAs of the transmission unit 200 are capable of receiving data and FPGAs of the reception unit 300 are capable of transmitting data, thereby providing two-way communication over the optical fiber 17.

The FPGAs of a modular card will only be permitted to join the daisy chain if sufficient bandwidth exists. Therefore, the system 100 can easily communicate the data of the data streams of each of the FPGAs across the fiber optic link without having to repacketize data or perform other computational intensive operations. The resulting system is correspondingly simple and cheap to maintain and operate.

To accommodate further data streams, a new set of FPGAs may be added to the system 100 by adding an additional modular card. When the new FPGAs are installed, the daisy chain will be reconstituted and time slots allocated to the FPGAs of the daisy chain according to the process described above.

Therefore, provided sufficient channel bandwidth is available, the system 100 is easily configurable to accommodate further FPGAs and corresponding data streams. This provides for easy and cheap expansion of the system.

As such, while the present invention has been described herein with reference to particular embodiments thereof, a latitude of modifications, various changes and substitutions are intended in the foregoing disclosure, and it will be appreciated that, in some instances, some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

The invention claimed is:

1. An optical fiber communications apparatus comprising:
    a housing provided with a motherboard and with a support defining a plurality of card receptors;
    a plurality of modular cards, each of which is engageable with the motherboard via one of the card receptors;
    an optical card comprising a first of said modular cards, said optical card including an optical transceiver for communication, using a digital optical communications signal, over a single optical fiber link, wherein
        each modular card being provided with a plurality of circuit sub-assemblies, each circuit sub-assembly being configured for digital communication with a respective local audio, video or data electronic device via a respective connector using a respective electronic information-carrying signal, and wherein
        each circuit sub-assembly being configured for communication of an audio, video or data information-carrying signal with the optical transceiver using the digital optical communications signal; and
    circuitry for assigning time periods for the individual information-carrying signals of the circuit sub-assemblies controlling transmission of communications between the optical transceiver and the circuit sub-assemblies, and time division multiplexing said communications over the single optical fiber link to communicate a predetermined combination of audio, video and data channels multiplexed onto a single optical channel carried by the optical fiber link.

2. Apparatus as claimed in claim 1 wherein said circuitry is configured to assign a time period to the information carrying signal of a corresponding circuit sub-assembly according to a maximum bandwidth of the corresponding circuit sub-assembly.

3. Apparatus as claimed in claim 2 wherein each modular card is adapted to determine whether a successive card is engaged with a bus and, if so, to inform the successive card, said successive card being adapted to add itself to a daisy chain.

4. Apparatus as claimed in claim 3 wherein said successive card only adds itself to the daisy chain if there is sufficient available bandwidth.

5. Apparatus as claimed in claim 1 wherein said optical transceiver operates at a channel bandwidth and each of said circuit sub-assemblies operates at corresponding sub-assembly bandwidths; wherein an available bandwidth comprises the channel bandwidth less the sum of the sub-assembly bandwidths of all of the circuit sub-assemblies of the daisy chain and wherein said successive card is adapted to add the circuit sub-assemblies of said successive card to the daisy chain only if the available bandwidth is equal to or greater than the combined sub-assembly bandwidths of the circuit sub-assemblies of said successive card.

6. Apparatus as claimed in claim 1, wherein the optical transceiver is such as to communicate using a digital optical communications signal operating in a first common communications protocol over the single optical fiber.

7. Apparatus as claimed in claim 1, wherein each circuit sub-assembly is such as to communicate with its respective electronic device using a second protocol which is an audio protocol, a video protocol or a data protocol.

8. Apparatus as claimed in claim 7 wherein the second protocol corresponds to data communicated by satellite.

9. Apparatus as claimed in claim 1, wherein the circuitry for assigning time periods is provided on the optical card.

10. Apparatus as claimed in claim 1, further comprising firmware on each circuit sub-assembly, the firmware on a given circuit sub-assembly controlling communications with the respective local electronic device.

11. Apparatus as claimed in claim 1 wherein each modular card comprises a plurality of sockets, each socket being adapted to receive a corresponding circuit sub-assembly.

12. Apparatus as claimed in claim 11 wherein any circuit sub-assembly is received by a corresponding socket of a modular card so that each circuit sub-assembly is removably pluggable.

13. Apparatus as claimed in claim 1 wherein any one of said modular cards is configurable according to the circuit sub-assemblies provided therewith.

14. Apparatus as claimed in claim 1, wherein each circuit sub-assembly is an FPGA mounted on an FPGA receiver associated with the respective modular card.

15. Apparatus as claimed in claim 1, wherein the digital, optical communications signal is an Ethernet protocol signal.

16. Apparatus as claimed in claim 1, wherein each information-carrying signal is any one of a group of video, audio, and data protocols including composite video, SDI, HDSDI, DVD-ASI, S-Video, VGA, DVI, and HDMI, analogue audio, studio quality audio, digital AES/EBU audio, RS-232, RS-422, RS-485, dry contact, 10/100 Ethernet, and gigabit Ethernet.

17. An optical fiber communications system comprising: a first optical fiber communications apparatus and a second optical fiber communications apparatus, each of which is as claimed in claim 1; and a single optical fiber link connecting the two optical fiber communications apparatuses for communication using a digital optical communications signal.

18. A system as claimed in claim 17, wherein each optical fiber communications apparatus has the same number of modular cards, the modular cards in the first optical fiber communications apparatus being arranged to mirror the configuration of the modular cards in the second optical fiber communications apparatus, and the circuit sub-assemblies provided in the first optical fiber communications apparatus being arranged so as to mirror the circuit sub-assemblies in the second optical fiber communications apparatus.

19. An optical fiber communications apparatus comprising:
a housing including a motherboard;
a plurality of modular cards, each of which is configurable as an optical card or as an electronic data card engageable with the motherboard;
an optical card including an optical transceiver for communication over a single optical fiber link using a digital optical communications signal, wherein
each modular card includes a plurality of circuit sub-assemblies, each circuit sub-assembly being configured for digital communication with a respective local audio, video or data electronic device via a respective connector using a respective electronic information-carrying signal, wherein
each circuit sub-assembly being configured in a daisy chain for communication of an audio, video or data information-carrying signal with the optical transceiver using the digital optical communications signal; and
circuitry for time division multiplexing communications between the optical transceiver and the circuit sub-assemblies over the single optical fiber link to communicate a combination of audio, video and data channels multiplexed onto a single optical channel carried by the optical fiber link, wherein
each modular card is configured to compare an available bandwidth against its own bandwidth and when said own bandwidth is less than said available bandwidth, to add its circuit sub-assembly to the daisy chain.

20. Apparatus as claimed in claim 19, wherein each circuit sub-assembly is such as to communicate with its respective electronic device using a second protocol which is an audio protocol, a video protocol or a data protocol, wherein the second protocol corresponds to data communicated by satellite.

* * * * *